(12) United States Patent
Hamburg

(10) Patent No.: US 6,421,460 B1
(45) Date of Patent: Jul. 16, 2002

(54) BLENDING COLORS IN THE PRESENCE OF TRANSPARENCY

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/306,374

(22) Filed: May 6, 1999

(51) Int. Cl.$^7$ .............................................. G06K 9/00
(52) U.S. Cl. ....................................... 382/162; 382/166
(58) Field of Search ................................. 382/162, 166, 382/167; 345/501

(56) References Cited

U.S. PATENT DOCUMENTS 5,912,682 A * 6/1999 Parkos ...................... 347/40
6,045,639 A * 4/2000 Davis ....................... 156/62

OTHER PUBLICATIONS

Apple Computer, *Inside MacIntosh: Quickdraw GX Objects*, Jun. 1994, Addison–Wesley Pub. Co., Chapter 5, pp. 5–5 to 5–37.
Apple Computer, Inside MacIntosh:Quickdraw Gx Objects, (1994) pp 5–5–5–37 and 5–43 to 5–56.

* cited by examiner

Primary Examiner—Bhavesh Mehta
Assistant Examiner—Anh Hong Do

(74) *Attorney, Agent, or Firm*—Fish & Richardson P.C.

(57) ABSTRACT

Methods and apparatus for blending colors in the presence of transparency. The method includes blending a lower and an upper graphic element in accordance with a transfer mode by calculating a transfer color from a lower element color and an upper element color according to the transfer mode without regard either to a lower element alpha or to an upper element alpha; calculating a resulting alpha from the lower element alpha and the upper element alpha without regard to any of the lower element color, the upper element color, or the transfer mode; and calculating a resulting color as a weighted average of the lower element color, the transfer color, and the upper element color. The transfer mode can be an arbitrary transfer mode and can be user defined. The resulting graphic element <C,c> having color value C and alpha value c can be calculated in accordance with $$<C,c> = X\text{Fade}(<A,a>, X\text{Fade}(<B,1>, <T(A,B), 1>, a), b),$$

where XFade ($<X,x>$, $<Y,y>$, $z$)=$<R,r>$ is an operation defined by the formulas $$r = \text{InterpolateAlpha}(x, y, z),$$

$$t = y \cdot z / r,$$

and $$R = \text{InterpolateColor}(X, Y, t)$$

and where the lower element is $<A,a>$ and the upper element is $<B,b>$. Each of the colors A, B, and C can be defined by a value for each of a plurality of colorants. The calculated values can defined by $c = a + b - a \cdot b$, and $C = A \cdot (1 - (b/c)) + B \cdot (1 - a) \cdot (b/c) + T(A,B) \cdot a \cdot (b/c)$.

53 Claims, 2 Drawing Sheets

BLENDING COLORS IN THE PRESENCE OF TRANSPARENCY

BACKGROUND OF THE INVENTION

The present invention is related to the compositing or blending of graphical image data.

Many graphics or image processing computer programs, such as Adobe® Photoshop®, available from Adobe Systems Incorporated, of San Jose, Calif., build a final image by compositing two or more image layers together. The image layers may be thought of as stacked sheets of acetate. The density of the ink on the acetate controls the transparency of the sheet, i.e., the extent to which that sheet obscures the images from the underlying sheets. In the computer program, the color and density of the ink on the acetate sheet are represented by a color value and an alpha value (representing opacity), respectively. Normally, an alpha value of zero means the corresponding region is fully transparent, and a value of one means it is fully opaque.

Each layer typically includes image data and compositing controls. Typically, the image data is represented by an array of pixels, with each pixel having a color and, optionally, an opacity. Similarly, if there is a mask, the mask is represented by an array of pixels, with each pixel having an opacity. Alternatively, the image data or the mask or both can be defined analytically, e.g., by using shape outlines, or by other functions which map positions to color and opacity. In addition, the image data and the mask can be dynamic, that is, computed from other data at the time the layers are composited.

The compositing controls may include a transfer mode, also known as a blending mode. The transfer mode of an image layer determines how the color in the image layer mixes with the color accumulated from the underlying layers in the same image position. More specifically, it is a recipe for blending colors that can be expressed as a function taking an upper color and lower color to produce a third color. Image manipulation computer programs, such as Photoshop®, generally provide a wide variety of predefined transfer modes. The basic transfer mode equation is:

new_color=α·T(lower_color, upper_color)+(1−α)·lower_color where α is the opacity of the upper layer, T is the selected transfer mode function, and lower_color and upper_color are the color values of the lower layer (which in some contexts is called the accumulation layer) and the upper layer for the graphical element whose color new_color is being calculated. The color values are not pre-multiplied by the opacity. Transfer modes should not be confused with the well-known Porter-Duff compositing operations, which define how the alpha values determine how much of the blended colors survive in the result, but which assume essentially normal mode color mixing. T. Porter and T. Duff, "Compositing Digital Images", SIGGRAPH 84, pp. 253–59 (1984).

The following table shows examples of transfer mode functions T. Each of the example transfer modes works componentwise; that is, each new colorant value is calculated based solely on the corresponding argument colorant values and independently of the values of different colorants. However, in the general case, transfer mode functions are not so limited. For example, there are hue, color, saturation, and luminosity modes that are based on doing a conversion to a hue, saturation, and luminance form (not exactly the same as either HSL or HSB because luminance is computed as a weighted average of red, green, and blue or cyan, magenta, and yellow multiplied by black), taking an appropriate mixture of the components from the upper and lower colors, and then performing a hue preserving clip to convert the color back into the RGB or CMY form. As is conventional, component colorants are treated as ranging from zero to one, with zero representing the darker end of the range, although in a typical implementation the actual values representing zero to one generally range across the values available at the colorants' bit depth. The exact effect of the blending mode will depend on the color space. The convention that zero is darker than one for each colorant means that 100% ink in CMYK is represented by zero and 0% ink is represented by one, whereas in RGB, no phosphor excitation is represented by zero and full excitation is represented by one.

| T (L, U) | Formula |
| --- | --- |
| Normal (L, U) | = U |
| Multiply (L, U) | = L · U |
| Screen (L, U) | = U + L − U · L = 1 − (1 − U) · (1 − L) |
| Difference (L, U) | = \|U − L\| |
| ColorDodge (L, U) | = Min (1,L/(1−U)), with 0/0 treated as 0 |
| ColorBurn (L, U) | = 1 −Min (1, (1 − L)/U), with 0/0 treated as 0 |
| Darker (L, U) | = Min (L, U) |
| Lighter (L, U) | = Max (L, U) |
| Add (L, U) | = Max(1 ,L + U) |
| Overprint (L, U) | = 1 −Add(1 − L,1 − U) |
| SoftLight (L, U) | = L − (1 − 2 · U) · L · (1 − L) if U ≤ 0.5 |
| | = L + (2 · U − 1) · (D(L) − L) if U ≥ 0.5, where |
| | D(x) = ((16 · x − 12) · x + 4) · x if x ≤ 0.25 = sqrt (x) if x ≤ 0.25 |

Image layers are generally composited in order from bottom to top. The general process for compositing an image layer begins with calculation of any dynamic data in the image layer, such as the color of the pixels in the image and the opacity of the pixels in the mask. Then, the opacity is determined for each pixel from the mask, the global opacity, if any, and the image data. Finally, the color of each pixel in the layer is combined with the color of the corresponding pixel in an accumulation buffer to generate a new composited color. The combination is controlled by the opacity of the pixel and the transfer mode.

Some computer programs, in addition to having predefined transfer modes, also give users the ability to define their own transfer modes. One such system is described in commonly-owned U.S. patent application Ser. No. 09/008,269 filed Jan. 16, 1998 to Hamburg, incorporated here by this reference, which discloses methods and apparatus, including computer programs, for use by a user to create new transfer modes (called compound transfer modes) based on existing (or newly-created) transfer modes and a scalar parameter, as appropriate.

In this specification, the terms color, alpha, and graphic element are used. A color is a representation of a particular color. The representation can be in any form suitable for computation and need only have the property that colors can be interpolated. Alpha is a quantity that characterizes the opacity of a graphic element. An alpha value of zero indicates total transparency. An alpha value of one indicates complete opacity. When working with graphic elements described with a color and alpha value, the color is free to be undefined or arbitrary if the alpha value is zero. A graphic element is a piece of the compositing process. Two graphic elements each having a color and alpha value are composited to produce a third graphic element. In a raster context, the primitive graphic element is a pixel. In a vector graphics context, it could be a region of solid color, such as a region defined by a PostScript path.

Raster accumulation is one example of compositing. In raster accumulation, the primitive graphic element is the pixel. The accumulation buffer is a collection of pixels arranged in a regular pattern—generally a grid. The elements to be accumulated are also collections of pixels. Every pixel has a color and may have an alpha value. To composite a single element into the accumulation buffer, each pixel in the accumulation buffer is composited with the corresponding pixel in the element to produce a new value for the accumulation buffer pixel. A stack of elements is composited by initializing the accumulation buffer and then compositing each element from bottom to top into the accumulation buffer. The final contents of the accumulation buffer represent the final image.

At least one prior art system provided compositing with transfer mode T for color blending without alpha in an accumulation buffer (i.e., with an implicit alpha value of one) as follows.

```
new_accumulation_color =
    InterpolateColor  (old_accumulation_color,
                      T (old_accumulation_color, element_color),
                      element_alpha)
``` where $$\text{InterpolateColor}(A, B, 0) = A$$

and $$\text{InterpolateColor}(A, B, 1) = B.$$

Conventionally, color interpolation is linear, and defined as $$\text{InterpolateColor}(A, B, \alpha) = A \cdot (1-\alpha) + B \cdot \alpha$$

with each color component (colorant) value computed separately.

Similarly, a prior art system provided compositing without transfer modes but with accumulated alpha as follows.

```
new_accumulation_alpha =   old_accumulation_alpha + element_alpha −
                           old_accumulation_alpha · element_alpha
new_accumulation_color =
    InterpolateColor (old_accumulation_color, element_color,
    element_alpha /new_accumulation_alpha)
```

The foregoing calculation was also used with a transfer mode that was the normal mode, that is, where T(lower, upper)=upper.

Where compositing involved both a transfer mode and an accumulated alpha, the prior art generally provided ad hoc solutions designed to work with specific transfer modes or kinds of transfer modes. Such ad hoc solutions involved doing things like temporarily matting the results in the accumulation buffer against a solid color or extending the accumulation buffer with special values. For example, a prior art technique for dealing with multiply mode is to extend the lower color and opacity with white before blending in the upper color. As a consequence, where there is no lower color, the result of the blend is the upper color. This technique works if something can play the role of white, but the technique cannot be applied in general. Another technique of ad hoc prior art systems is simply to expect pixel colors to be defined even where the alpha value is zero. In effect, this initializes the accumulation buffer to white or some other color wherever alpha is zero.

Another ad hoc method does a matte with a color, blend, and dematte. This method is applicable where a color M exists such that T(M,X)=X, in which case the following calculations are performed. In the calculations, A is the accumulated_color, a is the accumulated_alpha, B is the element_color, and b is the element_alpha.

$$A := M \cdot (1-a) + A \cdot a$$

$$A := A \cdot (1-b) + T(A,B) \cdot b$$

$$a := a + b - a \cdot b$$

$$A := (A - M \cdot (1-a))/a$$

Yet another ad hoc method extends with element data and then blend. To work properly, this method depends on the transfer mode satisfying T(X,X)=X. In terms of the definitions used above, the following calculations are performed by this method.

$$x := a$$

$$a := a + b - a \cdot b$$

$$t := x/a$$

$$A := B \cdot (1-t) + A \cdot t$$

$$A := A \cdot (1-b) + T(A,B) \cdot b$$

None of the ad hoc methods provides satisfactory results for ColorDodge or ColorBurn transfer modes, and none is suitable for use with arbitrary, user-defined transfer modes.

SUMMARY OF THE INVENTION

The invention features methods and apparatus, including computer program products, operable to blend two color-and-alpha pairs using any arbitrary transfer mode function to specify the color blending, providing, in the general case, transparency information in the result. The invention is particularly useful for accumulating a color-and-alpha value into an accumulation buffer, but it is generally useful for producing a blended color and alpha value given two color-and-alpha pairs and an arbitrary transfer mode.

In general, in one aspect, the invention includes blending a lower and an upper graphic element in accordance with an arbitrary transfer mode by calculating a transfer color from a lower element color and an upper element color according to the transfer mode without regard either to a lower element alpha or to an upper element alpha; calculating a resulting alpha from the lower element alpha and the upper element alpha without regard to any of the lower element color, the upper element color, or the transfer mode; and calculating a resulting color as a weighted average of the lower element color, the transfer color, and the upper element color. Advantageous implementations can include one or more of the following features. The weighted average is calculated as an interpolation of the lower element color and the upper element color interpolated with the transfer color, where the interpolation of the upper element color is governed by the lower element alpha and the interpolation of the lower element color is governed by the upper element alpha divided by the resulting alpha. The transfer mode can be user defined. Each of the lower and upper elements can have an alpha value between fully transparent and fully opaque, exclusive. Each of the lower and upper elements can be a pixel or a region. Each of the colors can be defined by a value for each of a plurality of colorants.

In general, in another aspect, the invention can be applied to accumulating graphic layers in a layer order. In this aspect, the invention includes providing an accumulation buffer having a plurality of graphic elements, each graphic element having color and alpha values; compositing the graphic elements of the layers into the accumulation buffer in the layer order; for each compositing of an accumulation element and a layer element of a layer having an associated transfer mode function, (i) calculating a resulting alpha value from the alpha values of the accumulation element and the layer element, (ii) calculating a resulting color value from a color value of the accumulation element, a color value of the layer element, and the transfer mode function, and (iii) updating the accumulation buffer by storing the resulting color value and the resulting alpha value in the accumulation buffer; wherein the resulting color is a weighted average of the color value of the accumulation element, the color value of the layer element, and the value of the transfer mode function applied to the color value of the accumulation element and the color value of the layer element, the weights for the weighted average being determined by the alpha value of the accumulation element and the alpha value of the layer element. The invention is advantageously applied in situations where, after accumulating at least one of the layers into the accumulation buffer, not all the elements of the accumulation buffer have the same alpha value; where at least one of the resulting alpha values stored in the accumulation buffer is an alpha value between fully transparent and fully opaque, exclusive; where at least one of the elements of at least one of the second through last layers in the layer order has an alpha value between fully transparent and fully opaque, exclusive; where the transfer mode associated with at least one of the layers lightens the accumulation color; or where the transfer mode associated with at least one of the layers applies different lightening or darkening effects depending on the color of the layer element.

Advantages that can be seen in implementations of the invention include one or more of the following. The invention provides fully general handling of transfer modes in compositing with accumulated alpha and does so in a consistent manner producing sensible, visually continuous and therefore pleasing results, particularly when compositing into an accumulation buffer having both zero and non-zero alpha values. The compositing results match the two special cases described above—compositing without transfer modes but with accumulated alpha and compositing without accumulated alpha but with transfer modes—and do at least as well as current special-case-based solutions. In particular, for a source color, a source alpha value, and a transfer mode being blended into an accumulation buffer, the following desirable conditions are satisfied.

(a) If the accumulation buffer is entirely transparent—i.e., the accumulation alpha value is 0—there is nothing to blend with, and the resulting accumulated color and alpha value is the same as source color and source alpha.

(b) If the accumulation buffer is fully opaque—i.e., the alpha value is 1—the resulting color is the same as in the case where the accumulation buffer simply does not have an alpha component and the accumulated alpha value remains 1.

(c) The intermediate results are visually continuous—i.e., if the initial accumulation buffer contains an alpha value of 1%, then the results are very similar to the case where it contains an alpha value of 0; if the accumulation buffer contains an alpha value of 99%, then the results are very similar to the 100% case.

(d) If the source alpha value is zero, the resulting accumulated color and alpha value match the initial accumulated color and alpha value.

(e) The intermediate results are visually continuous with changes in the source opacity.

(f) Alpha values are combined in the same way with and without a transfer mode.

(g) The compositing operation does not depend on special properties of a selected transfer mode and therefore operates easily with new transfer mode functions, including user-defined functions.

In addition, the invention simplifies the design of graphics manipulation systems, whether implemented in hardware, software, firmware, or any combination of them. A system using the invention can accept as input any number of layers of graphic elements having any arbitrary selection of color and alpha values, and can further accept and associate with any of the layers any arbitrary transfer mode function, and composite the elements according to the transfer modes in a fully general way. The invention allows the colors for the accumulation or the source to be arbitrary when the accumulated alpha or source alpha is zero, respectively.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
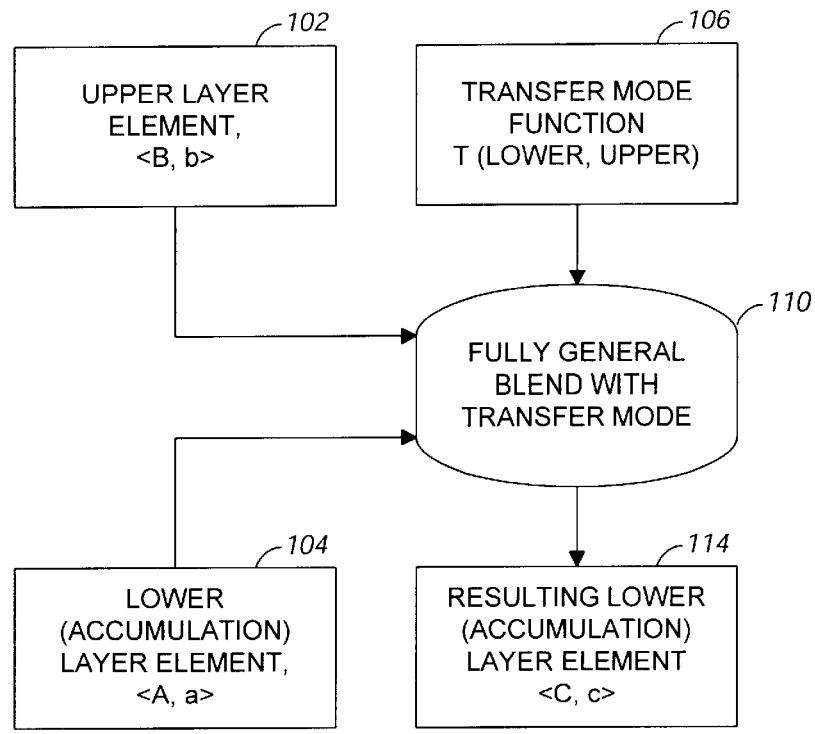
FIG. 1 illustrates the operation of a system performing a fully general blending operation with transfer mode in accordance with the invention.

As shown in FIG. 1, in a system or process performing a fully general compositing or blending operation in accordance with the invention, a foreground or upper graphic element 102 and a background, lower, or accumulation graphic element 104 are blended according to a transfer mode function T(lower, upper) 106. In the general case, each graphic element has a color and an alpha, which are shown in the notation <color, alpha>. The color itself may include a number of elements referred to as colorants. For example, a graphic element in RGB color space includes three colorant values: one each for red, green, and blue. Generally but not invariably, computations performed on colors are performed on each colorant value separately.

The lower and upper color-and-alpha pairs are blended (operation 110) in accordance with the transfer mode function 106 to generate a resulting or blended color-and-alpha pair 114.

The transfer mode function 106 can be an arbitrary transfer mode function. The transfer mode can be pre-defined in the system or it can be user-defined. A system can receive a user definition of a transfer mode interactively or otherwise and in a variety of forms, including as a user definition of a compound transfer mode or as a user definition of a transfer mode function T expressed, for example, as a formula or in a plug-in module. An arbitrary transfer mode can be used because the fully-general blend operation 110 does not make use of any properties of the transfer mode function 106. Examples of useful transfer mode functions follow. The normal blend mode produces a weighted average of the foreground and background colors as a result of the color interpolation step. The shadow or multiply blend mode simulates a shadow by scaling the background color towards dark proportional to the darkness and color of the foreground color. The glow or screen blend mode simulates a glow by scaling the background color towards light proportional to the lightness and color of the foreground color. It can also be likened to shining two slide projectors on the same screen. The darker blend mode selects the darker of the foreground and background colors. The lighter blend mode selects the lighter of the foreground and background colors. The color dodge and color burn blend modes lighten and darken colors, roughly simulating the photographic darkroom dodge and burn processes. The soft light blend mode applies different lightening or darkening effects depending on the upper color; the effect is similar to shining a diffused spotlight on an image. The hue blend mode creates a result color with the luminance and saturation of the lower color and the hue of the upper color. The saturation blend mode creates a result color with the luminance and hue of the lower color and the saturation of the upper color. The color blend mode creates a result color with the luminance of the lower color and the hue and saturation of the upper color. The luminosity blend mode creates a result color with the hue and saturation of the lower color and the luminance of the upper color. The add blend mode simulates two combined light sources by adding color intensities. The overprint blend mode simulates overprinting of two inks by adding ink color values. Use of the general blend operation 110 is particularly advantageous with the color dodge and soft light transfer modes.

Figure 2:
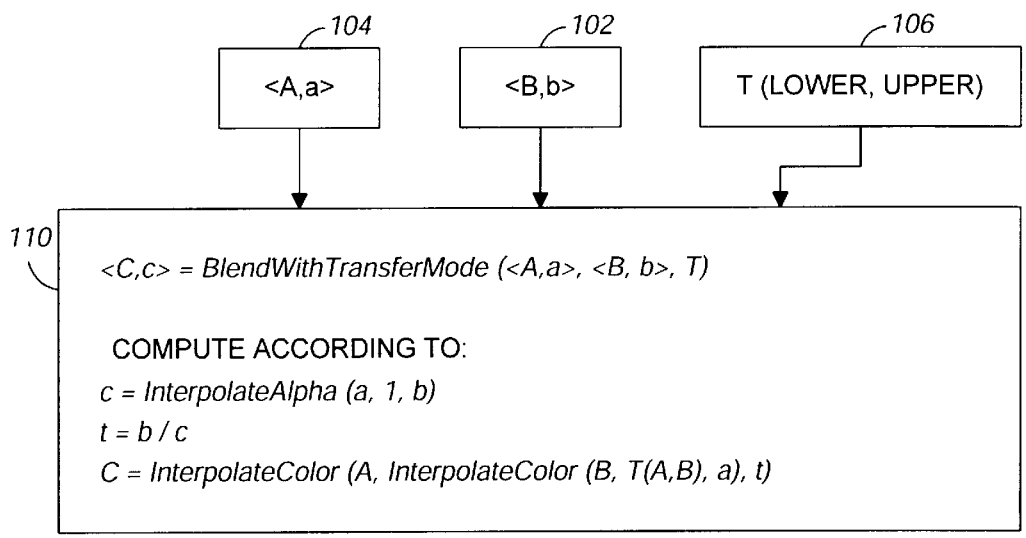
FIG. 2 illustrates a computation of the results of the blending operation.

As shown in FIG. 2, and in the terminology of layer accumulation, the following formulas define the fully general blending operation 110 (BlendWithTransferMode) with transfer mode function T.

```
new_accumulation_alpha
    = InterpolateAlpha (old_accumulation_alpha, 1, element_alpha)
new_accumulation_color =
    InterpolateColor (old_accumulation_color,
        InterpolateColor (element_color,
            T (old_accumulation_color, element_color),
            old_accumulation_alpha),
        element_alpha / new_accumulation_alpha)
```

In terms of two color-and-alpha pairs, <A,a> and <B,b>, which are the lower and upper colors, respectively, a transfer mode function T, and conventional linear interpolation for alpha and color values, the definition of fully general blending can be expressed as follows. The result of the blending operation is <C,c>. The parts of the result are defined by the following formulas.

$$c = \text{InterpolateAlpha}(a, 1, b)$$

$$t = b/c$$

$$C = \text{InterpolateColor}(A, \text{InterpolateColor}(B, T(A, B), a), t)$$

With linear interpolation for alpha and color values, the formula reduce to the following.

$$c = a + b - a \cdot b$$

$$t = b/c$$

$$C = A \cdot (1-t) + B \cdot (1-a) \cdot t + T(A, B) \cdot a \cdot t$$

The new color formula uses more variables than were needed to perform the prior art calculations described earlier. As a result, more temporary resources are needed to keep values for processing.

Assuming that the element components <B, b> are not writable and that one wants to process the accumulation component <A,a> in place, the computation can be done as follows:

blended_color := $T$(accumulation_color, element_color)

blended_color := InterpolateColor(element_color, blended_color, accumulation_alpha)

accumulation_alpha := InterpolateAlpha(accumulation$_{13}$ alpha, 1, elementa_alpha)

accumulation_color := InterpolateColor(accumulation_color, blended_color, element_alpha/accumulation_alpha)

or $X := T(A, B)$ $X := \text{InterpolateColor}(B, X, a)$ $a := \text{InterpolateAlpha}(a, 1, b)$ $A := \text{InterpolateColor}(A, X, b/a)$ In the case of linear interpolation for alpha and color values, with optional use of a temporary variable k, this becomes:

$X := T(A, B)$ $X := B \cdot (1-a) + X \cdot a$ (or, equivalently, $X := B + (X-B) \cdot a$)

$a := a + b - a \cdot b$ $k := b/a$ $A := A \cdot (1-k) + X \cdot k$ (or, equivalently, $A := A + (X-A) \cdot k$)

As has been noted, the interpolation provided by InterpolateAlpha and InterpolateColor need not be a linear interpolation. For example, InterpolateColor can be defined to do different things in different color spaces, subject to the usability constraints that it have appropriate endpoint behaviors and appear continuous and pleasing in between. As an example, one might want to express the colors in one color space but do the actual interpolation in another color space (e.g., interpolating in the CIE XYZ color space). As another example, one might want to convert gamma-encoded values to unencoded values, interpolate the unencoded values, and then convert the result back as the result of the interpolation.

Figure 3:
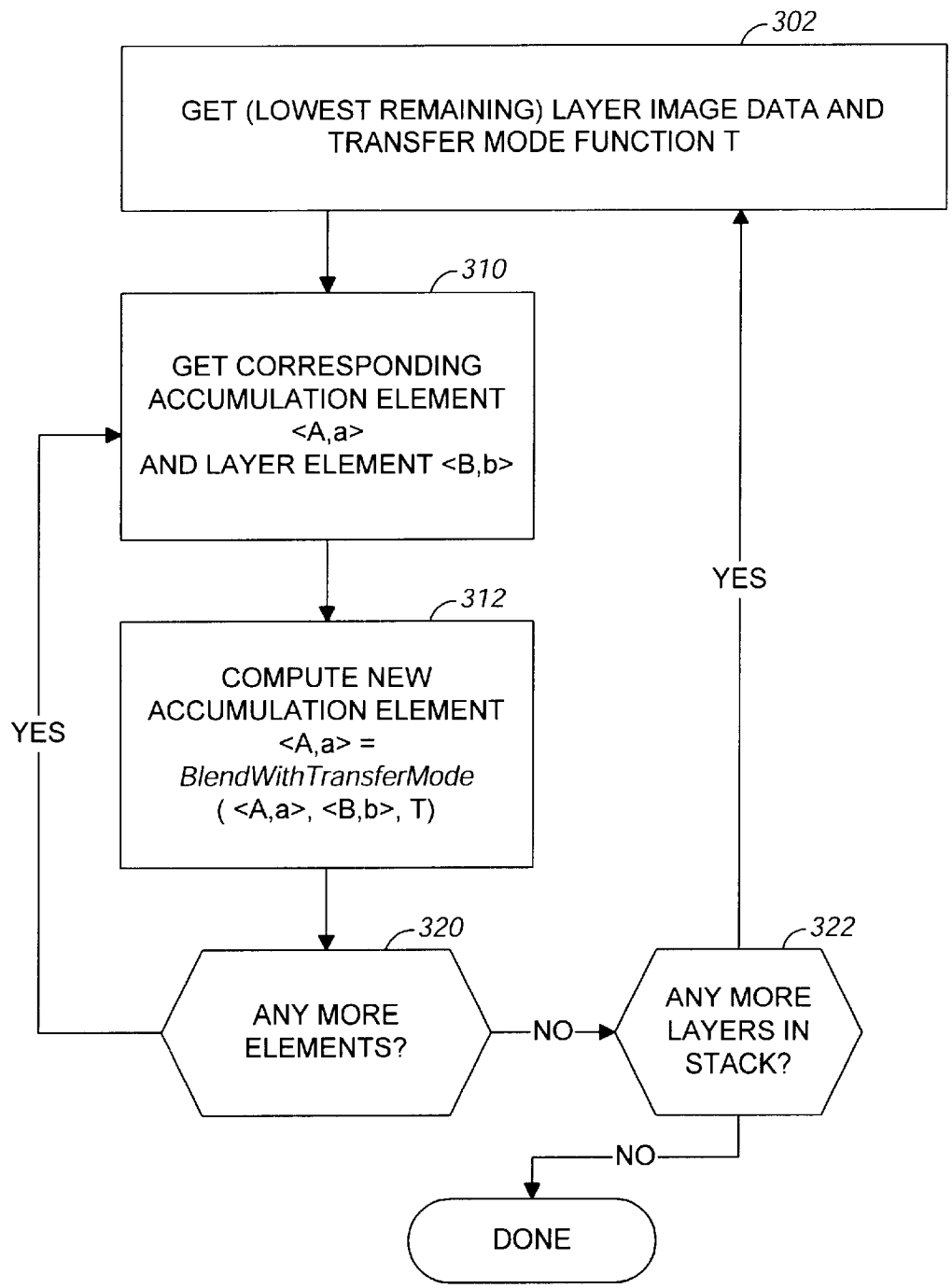
FIG. 3 illustrates a process of accumulating layers of graphic elements in accordance with the invention.

FIG. 3 illustrates the use of the fully general blending operation in compositing a stack of two or more blend layers to build a final image. In practice, each layer will typically include both image data and compositing controls. The compositing controls may include a transfer mode, also known as a blending mode, which is represented for computation by a transfer mode function T, as has been described. The image data for a layer is represented by graphic elements, such as pixels arranged in a grid.

A stack of layers is composited by initializing an accumulation buffer and then compositing layer elements from bottom to top into the accumulation buffer. The process obtains the values of the elements of the accumulation buffer and of the current layer (steps 302, 310). It may be necessary to calculate the graphic elements of the current layer. Then, the color of each element in the layer is composited with the color of the corresponding element in the accumulation buffer to generate a new composited color (step 312). This is done using the BlendWithTransferMode operation 110 (FIG. 1); the combination is controlled by the opacities of the two elements and the transfer mode, and the elements in the accumulation buffer have calculated (that is, not implicit) alpha values. After all the elements of the current, bottom-most layer have been composited ('no' branch from decision step 320), the process continues with the next layer ('yes' branch from decision step 322) until all elements and layers have been processed bottom to top. The final contents of the accumulation buffer represent the final image.

The foregoing formulas and processes may perhaps be better understood in light of the following analysis.

The known crossfade operation $$<C,c>=XFade(<A,a>, <B,b>, u)$$

is defined as follows. When u is 0, $$<C,c>=<A,a>.$$

When u is 1, $$<C,c>=<B,b>.$$

Intermediate values were calculated as follows:

$$c=a \cdot (1-u)+b \cdot u$$

$$t=b \cdot u/c$$

$$C=A \cdot (1-t)+B \cdot t$$

This definition is now generalized as follows.

$$c=\text{InterpolateAlpha}(a, b, u)$$

$$t=b \cdot u/c$$

$$C=\text{InterpolateColor}(A, B, t)$$

Crossfade is the operation to use when blending between an accumulation buffer representing an image before applying masked elements and the accumulation buffer representing the image after applying the masked elements.

Now consider the blending function Blend (<A,a>, <B,b>), which composites upper element <B,b> into lower (accumulation) element <A,a>. The familiar linear compositing equations teach that the result <C,c> is defined by:

$$c=a+b-a \cdot b$$

$$t=b/c$$

$$C=A \cdot (1-t)+B \cdot t$$

It is straightforward to confirm that applying a mask u directly to <B,b> to produce <B, b·u> and compositing this into <A,a> produces the same results as using the blend and crossfade approach. That is:

$$\text{Blend}(<A,a>, <B,b \cdot u>)=X\text{Fade}(<A,a>, \text{Blend}(<A,a>, <B,b>), u)$$

This permits one to represent compositing <B,b> into <A,a> as treating all of the alpha component for <B,b> as part of the masking process. That is:

$$\text{Blend}(<A,a>, <B,b>)=X\text{Fade}(<A,a>, \text{Blend}(<A,a>, <B,1>), b)$$

This follows from the foregoing equations.
Furthermore:

$$\text{Blend}(<A,a>, <B,b>)=X\text{Fade}(<B,b>, \text{Blend} <A,1>, <B,b>), a).$$

Thus, Blend(<A,a>, <B,b>) can be computed as follows.

$$\text{Blend}(\langle A, a\rangle, \langle B, b\rangle)$$

$$= X\text{Fade}(\langle A, a\rangle, \text{Blend}(\langle A, a\rangle, \langle B, 1\rangle), b)$$

$$= X\text{Fade}(\langle A, a\rangle, X\text{Fade}(\langle B, 1\rangle, \text{Blend}(\langle A, 1\rangle, \langle B, 1\rangle), a), b)$$

Into this formula one can introduce the transfer mode function T(lower, upper), as follows:

$$\text{BlendWithTransferMode}(<A,a>, <B,b>, T)=X\text{Fade}(<A,a>, X\text{Fade}(<B,1>, <T(A,B), 1>, a), b)$$

The middle term can be reduced as follows.

$$X\text{Fade}(\langle B, 1\rangle, \langle T(A, B), 1\rangle, a) = \langle X, x\rangle$$

$$x = \text{InterpolateAlpha}(1, 1, a)$$

$$= 1$$

$$s = 1 \cdot a/x$$

$$= a$$

$$X = \text{InterpolateColor}(B, T(A, B), s)$$

$$= \text{InterpolateColor}(B, T(A, B), a)$$

From this it can be seen that, where the interpolations are linear, the result $$<C,c>=\text{BlendWithTransferMode}(<A,a>, <B,b>, T)$$

is defined by:

$$c=a+b-a \cdot b$$

$$t=b/c$$

$$C=A \cdot (1-t)+B \cdot (1-a) \cdot t+T(A,B) \cdot a \cdot t$$

Without the condition that the interpolations be linear, the result <C,c> is defined by:

$$c=\text{InterpolateAlpha}(a, 1, b)$$

$$t=b/c$$

$$C=\text{InterpolateColor}(A, \text{InterpolateColor}(B, T(A,B), a), t)$$

InterpolateColor can be generalized to be a weighted averaging operation for colors—i.e., a function that takes n colors and n weights between 0 and 1 that sum to 1 and generates a resulting color. For this condition to be satisfied requires, for example, that InterpolateColor satisfy the following equation:

$$\text{InterpolateColor}(A, \text{InterpolateColor}(A, B, u), v) =$$
$$\text{InterpolateColor}(A, B, u \cdot v)$$

As a weighted averaging operation for colors, InterpolateColor, as applied above, averages the colors A, B, and T(A,B) using the weights (1−t), (1−a)·t, and a·t. Expanding out the weights, one finds that their respective values are:

$a \cdot (1-b)/c$ $(1-a) \cdot b/c$ $a \cdot b/c$.

The compositing model that has been used in the described implementation is essentially the Porter-Duff "over" operator. However, the principles of the invention are applicable to other compositing models. For example, one can use the "atop" operator to define the compositing model, sometimes referred to as clipped blending, which basically blends as if the underlying element had an alpha value of 1 and then using the underlying element's alpha value in the result. With clipped blending as the compositing model, it turns out that the result <C,c> is defined by:

$c = a$ $C = \text{InterpolateColor}(A, T(A,B), b)$

The result derived above, namely $C = \text{InterpolateColor}(A, \text{InterpolateColor}(B, T(A,B), a), t)$ has a dual, which can be seen by recognizing the identity that ti $A$ OVER $B = (A$ ATOP $B)$ OVER$A$.

That is, the following dual result can also be used.

$\langle X, x \rangle = \langle B, b \rangle$ ATOP $\langle A, a \rangle$ with transfer mode $T$ $\langle C, c \rangle = \langle X, x \rangle$ OVER $\langle B, b \rangle$ While the calculations presented earlier preserve the blended color across the alpha calculation, with this dual result one need only preserve the old accumulated alpha across the new accumulated alpha calculation. The resulting steps, then, are as follows:

blended_color:=$T$(accumulation_color, element_color)

accumulation color:=InterpolateColor(accumulation_color, blended color), element alpha)

old_accumulation_alpha:=accumulation_alpha accumulation_alpha:=InterpolateAlpha(accumulation_alpha, 1, element_alpha)

accumulation_color:=InterpolateColor(B, accumulation_color, old_accumulation_alpha/accumulation_alpha)

Thus, the parts of the result <C,c>=BlendWithTransferMode (<A,a>, <B,b>, T) can also be defined by the following formulas.

$c = \text{InterpolateAlpha}(a, 1, b)$ $t = a/c$ $C = \text{InterpolateColor}(B, \text{InterpolateColor}(A, T(A, B), b), t)$ With linear interpolation of alpha and definitions of InterpolateColor based on weighted color averaging, this expands to the same formula given earlier for $C = \text{InterpolateColor}(A, \text{InterpolateColor}(B, T(A,B), a), t)$ with $t = b/c$ namely $C = A \cdot a \cdot (1-b)/c + B \cdot (1-a) \cdot b/c + T(A,B) \cdot a \cdot b/c$ The computation of the dual form may be simpler in the case of linear interpolations, as shown in the following steps, with an optional temporary variable t.

$A := A \cdot (1-b) + T(A,B) \cdot b$ $x := a$ $a := a + b - a \cdot b$ $t := x/a$ $A := B \cdot (1-t) + A \cdot t$ The invention has been described in terms of particular embodiments. Other embodiments are within the scope of the following claims. For example, the steps of the invention can be performed in a different order and still achieve desirable results. Thus, although the process of compositing has been described as proceeding layer-by-layer, the compositing can proceed in other orders, as long as the compositing for each element position occurs in the proper order. The invention can be implemented in a vector context as well as in the described raster context. The invention can be implemented for graphics elements that are regions, such as PostScript paths.

The invention has generally been described in terms of loops of the form "for each layer do {for each pixel do { } }". The operations can also be organized in loops of the form "for each pixel do {for each layer do { } }", in loops of the form "for each region do {for each layer do {for each pixel in the region do { } } }", in loops of the form "for each region do {for each pixel in the region do {for each layer do { } } }", and so on. In performing the operations of the invention analytically, one could find all of the primitive regions and then compute their colors, or accumulate a changing set of regions complete with colors as each layer is added.

What is claimed is:

1. A method of blending a lower graphic element and an upper graphic element in accordance with a transfer mode associated with the upper graphic element, each element having a color and an alpha, comprising:

calculating a transfer color from the lower element color and the upper element color according to the transfer mode without regard either to the lower element alpha or to the upper element alpha;

calculating a resulting alpha from the lower element alpha and the upper element alpha without regard to any of the lower element color, the upper element color, or the transfer mode; and calculating a resulting color as a weighted average of the lower element color, the transfer color, and the upper element color.

2. The method of claim 1, wherein the weighted average is calculated as an interpolation of the lower element color and the upper element color interpolated with the transfer color, where the interpolation of the upper element color is governed by the lower element alpha and the interpolation of the lower element color is governed by the upper element alpha divided by the resulting alpha.

3. The method of claim 1, wherein:

the lower element has a color value A and an alpha value a, the upper element has a color value B and an alpha value b, and the transfer mode is defined by transfer mode function T;

the transfer color is calculated as T(A,B);

the resulting alpha c is calculated from the values a, b and 1; and the resulting color C is calculated as a weighted average of the colors A, B, and T(A,B), with weights determined by the values a and b.

4. The method of claim 3, further comprising:

receiving from a user a definition of the transfer mode.

5. The method of claim 3, wherein the weights for the weighted average of the colors A, the colors B, and the transfer colors T(A,B) are $(1-(b/c))$, $(1-a)\cdot b/c$, and $a\cdot b/c$, respectively.

6. The method of claim 5, wherein the calculated values are:

$$c = a + b - a \cdot b$$

$$C = A \cdot (1-(b/c)) + B \cdot (1-a) \cdot (b/c) + T(A, B) \cdot a \cdot (b/c).$$

7. The method of claim 3, wherein the resulting graphic element <C,c> having color value C and alpha value c is calculated in accordance with $$<C,c> = X\text{Fade}(<A,a>, X\text{Fade}(<B, 1>, <T(A,B), 1>, a), b),$$

where XFade(<X,x>, <Y,y>, z)=<R,r> is an operation defined by the formulas $$r = \text{InterpolateAlpha}(x, y, z),$$

$$t = y \cdot z / r,$$

and $$R = \text{InterpolateColor}(X, Y, t).$$

8. The method of claim 7, wherein:

each of the lower and upper elements has an alpha value between fully transparent and fully opaque, exclusive.

9. The method of claim 7, wherein:

each of the lower and upper elements is a pixel.

10. The method of claim 7, wherein:

InterpolateAlpha is a linear interpolation function yielding $r = x \cdot (1-z) + y \cdot z$; and InterpolateColor is a linear interpolation function yielding $R = X \cdot (1-t) + Y \cdot t$.

11. The method of claim 10, wherein:

each of the lower and upper elements has an alpha value between fully transparent and fully opaque, exclusive.

12. The method of claim 10, wherein:

each of the lower and upper elements is a pixel.

13. The method of claim 7, wherein:

each of the lower and upper elements is a region.

14. The method of claim 7, wherein:

each of the colors A, B, and C is defined by a value for each of a plurality of colorants.

15. The method of claim 7, further comprising:

receiving from a user a definition of the transfer mode.

16. A method of compositing a lower graphic element <A,a> and an upper graphic element <B,b> with a transfer mode defined by a transfer mode function T, the lower element having a color value A and an alpha value a, the upper element having a color value B and an alpha value b, the method comprising:

calculating a resulting graphic element <C,c> having color value C and alpha value c in accordance with $$<C,c> = X\text{Fade}(<A,a>, X\text{Fade}(<B,1>, <T(A,B), 1>, a), b),$$

where XFade(<X,x>, <Y,y>, z)=<R,r> is an operation defined by the formulas $$r = \text{InterpolateAlpha}(x, y, z),$$

$$t = y \cdot z / r,$$

and $$R = \text{InterpolateColor}(X, Y, t);$$

and where the alpha value a is not equal to 1 and the function T(A, B) is different from B for some value of A.

17. The method of claim 16, wherein:

each of the upper and lower elements is a pixel having an alpha value between fully transparent and fully opaque, exclusive.

18. The method of claim 17, wherein:

InterpolateAlpha is a linear interpolation function yielding $r = x \cdot (1-z) + y \cdot z$; and InterpolateColor is a linear interpolation function yielding $R = X \cdot (1-t) + Y \cdot t$.

19. A method of accumulating graphic layers in a layer order, each layer comprising a plurality of graphic elements, comprising:

providing an accumulation buffer having a plurality of graphic elements, each graphic element having color and alpha values;

compositing the graphic elements of the layers into the accumulation buffer in the layer order;

for each compositing of an accumulation element and a layer element of a layer having an associated transfer mode function, (i) calculating a resulting alpha value from the alpha values of the accumulation element and the layer element, (ii) calculating a resulting color value from a color value of the accumulation element, a color value of the layer element, and the transfer mode function, and (iii) updating the accumulation buffer by storing the resulting color value and the resulting alpha value in the accumulation buffer; wherein the resulting color is a weighted average of the color value of the accumulation element, the color value of the layer element, and the value of the transfer mode function applied to the color value of the accumulation element and the color value of the layer element without regard either to the alpha of the accumulation element or to the alpha value of the layer element, the weights for the weighted average being determined by the alpha value of the accumulation element and the alpha value of the layer element.

20. The method of claim 19, wherein, after accumulating at least one of the layers into the accumulation buffer, not all the elements of the accumulation buffer have the same alpha value.

21. The method of claim 19, wherein at least one of the resulting alpha values stored in the accumulation buffer is an alpha value between fully transparent and fully opaque, exclusive.

22. The method of claim 21, wherein at least one of the elements of at least one of the second through last layers in the layer order has an alpha value between fully transparent and fully opaque, exclusive.

23. The method of claim 19, wherein, after accumulating at least one of the layers into the accumulation buffer, not all the elements of the accumulation buffer have the same alpha value.

24. The method of claim 19, wherein at least one of the resulting alpha values stored in the accumulation buffer is an alpha value between fully transparent and fully opaque, exclusive.

25. The method of claim 19, wherein the transfer mode associated with at least one of the layers lightens the accumulation color.

26. The method of claim 25, wherein the transfer mode is represented by a function T that calculates a blended color from a lower color L and an upper color U in accordance with $T(L, U)=\min(1, L/(1-U))$, with 0/0 treated as 0.

27. The method of claim 19, wherein the transfer mode associated with at least one of the layers applies different lightening or darkening effects depending on the color of the layer element.

28. The method of claim 27, wherein the transfer mode is represented by a function T that calculates a blended color from a lower color L and an upper color U in accordance with $$T(L, U)=L-(1-2 \cdot U) \cdot L \cdot (1-L) \text{ if } U \leq 0.5$$

and $$T(L, U)=L+(2 \cdot U-1) \cdot (D(L)-L) \text{ if } U \geq 0.5,$$

where $$D(x)=((16 \cdot x-12) \cdot x+4) \cdot x \text{ if } x \leq 0.25,$$

and $$D(x)=\operatorname{sqrt}(x) \text{ if } x \geq 0.25.$$

29. The method of claim 19, wherein the transfer mode is user defined.

30. A system for blending a lower graphic element and an upper graphic element in accordance with an arbitrary transfer mode associated with the upper graphic element, each element having a color and an alpha, comprising:

means for calculating a transfer color from the lower element color and the upper element color according to the transfer mode without regard either to the lower element alpha or to the upper element alpha;

means for calculating a resulting alpha from the lower element alpha and the upper element alpha without regard to any of the lower element color, the upper element color, or the transfer mode; and means for calculating a resulting color as a weighted average of the lower element color, the transfer color, and the upper element color.

31. The system of claim 30, wherein the weighted average is calculated as an interpolation of the lower element color and the upper element color interpolated with the transfer color, where the interpolation of the upper element color is governed by the lower element alpha and the interpolation of the lower element color is governed by the upper element alpha divided by the resulting alpha.

32. The system of claim 30, wherein:

the lower element has a color value A and an alpha value a, the upper element has a color value B and an alpha value b, and the transfer mode is defined by transfer mode function T;

the transfer color is calculated as T(A,B);

the resulting alpha c is calculated from the values a, b and 1; and the resulting color C is calculated as a weighted average of the colors A, B, and T(A,B), with weights determined by the values a and b.

33. The system of claim 32, further comprising:

means for receiving from a user a definition of the transfer mode.

34. The system of claim 32, wherein the calculated values are:

$$c=a+b-a \cdot b$$

$$C=A \cdot (1-(b/c))+B \cdot (1-a) \cdot (b/c)+T(A, B) \cdot a(b/c).$$

35. The system of claim 32, wherein the resulting graphic element <C,c> having color value C and alpha value c is calculated in accordance with $$<C,c>=X\text{Fade}(<A,a>, X\text{Fade}(<B,1>, <T(A,B), 1>, a), b),$$

where XFade (<X,x>, <Y,y>, z)=<R,r> is an operation defined by the formulas $$r=\text{InterpolateAlpha}(x, y, z),$$

$$t=y \cdot z/r,$$

and $$R=\text{InterpolateColor}(X, Y, t).$$

36. The system of claim 32, wherein:

each of the colors A, B, and C is defined by a value for each of a plurality of colorants.

37. A computer program product, tangibly stored on a computer-readable medium, for blending a lower graphic element and an upper graphic element in accordance with a transfer mode associated with the upper graphic element, each element having a color and an alpha, the product comprising instructions operable to cause a computer to:

calculate a transfer color from the lower element color and the upper element color according to the transfer mode without regard either to the lower element alpha or to the upper element alpha;

calculate a resulting alpha from the lower element alpha and the upper element alpha without regard to any of the lower element color, the upper element color, or the transfer mode; and calculate a resulting color as a weighted average of the lower element color, the transfer color, and the upper element color.

38. The product of claim 37, wherein:

each of the lower and upper elements has an alpha value between fully transparent and fully opaque, exclusive.

39. The product of claim 37, wherein:

each of the lower and upper elements is a pixel.

40. The product of claim 37, wherein:

each of the lower and upper elements is a region.

41. The product of claim 37, wherein:

each of the lower graphic element color, the upper graphic element color, and the resulting color is defined by a value for each of a plurality of colorants.

42. The product of claim 37, wherein the weighted average is calculated as an interpolation of the lower element color and the upper element color interpolated with the transfer color, where the interpolation of the upper element color is governed by the lower element alpha and the interpolation of the lower element color is governed by the upper element alpha divided by the resulting alpha.

43. The product of claim 37, wherein:
  the lower element has a color value A and an alpha value a, the upper element has a color value B and an alpha value b, and the transfer mode is defined by transfer mode function T;
  the transfer color is calculated as T(A,B);
  the resulting alpha c is calculated from the values a, b and 1; and
  the resulting color C is calculated as a weighted average of the colors A, B, and T(A,B), with weights determined by the values a and b.

44. The product of claim 43, further comprising instructions to:
  receive from a user a definition of the transfer mode.

45. The product of claim 44, wherein the definition of the transfer mode is received in the form of a definition of a compound transfer mode.

46. The product of claim 44, wherein the definition of the transfer mode is received in the form of a formula defining the function T.

47. The product of claim 43, wherein the weights for the weighted average of the colors A, B, and T(A,B) are $(1-(b/c))$, $(1-a)\cdot b/c$, and $a\cdot b/c$, respectively.

48. The product of claim 47, wherein the calculated values are:

$$c = a + b - a\cdot b$$

$$C = A\cdot(1-(b/c)) + B\cdot(1-a)\cdot(b/c) + T(A, B)\cdot a\cdot(b/c).$$

49. The product of claim 43, wherein the resulting graphic element <C,c> having a color value C and an alpha value c is calculated in accordance with $$<C,c> = X\text{Fade}(<A,a>, X\text{Fade}(<B,1>, <T(A,B), 1>, a), b),$$

where XFade (<X,x>, <Y,y>, z)=<R,r> is an operation defined by the formulas $$r = \text{InterpolateAlpha}(x, y, z),$$

$$t = y\cdot z/r,$$

and $$R = \text{InterpolateColor}(X, Y, t).$$

50. The product of claim 49, wherein:
  InterpolateAlpha is a linear interpolation function yielding $r = x\cdot(1-z) + y\cdot z$; and
  InterpolateColor is a linear interpolation function yielding $R = X\cdot(1-t) + Y\cdot t$.

51. The product of claim 50, wherein:
  each of the lower and upper elements has an alpha value between fully transparent and fully opaque, exclusive.

52. The product of claim 50, wherein:
  each of the lower and upper elements is a pixel.

53. The product of claim 37 for accumulating graphic layers in a layer order, each layer comprising a plurality of upper graphic elements, the product further comprising instructions to:
  provide an accumulation buffer having a plurality of graphic elements, each graphic element having color and alpha values;
  composite the graphic elements of the layers into the accumulation buffer in the layer order; and
  for each compositing of an accumulation element and a layer element of a layer having an associated transfer mode function, calculate the resulting alpha and the resulting color as recited in claim 37.

* * * * *

UNITED STATES PATENT AND TRADEMARK OFFICE
CERTIFICATE OF CORRECTION

PATENT NO. : 6,421,460 B1
DATED : July 16, 2002
INVENTOR(S) : Mark Hamburg

It is certified that error appears in the above-identified patent and that said Letters Patent is hereby corrected as shown below:

Title page,
Item [56], References Cited, OTHER PUBLICATIONS, please correct the following: replace "5-5-5-37" with -- 5-5 to 5-37 --.

Column 15,
Lines 28-39, replace all instances of "$\leqq$" with -- $\leq$ --, and "$\geqq$" with -- $\geq$ --.

Signed and Sealed this

Third Day of February, 2004

JON W. DUDAS
*Acting Director of the United States Patent and Trademark Office*